Oct. 4, 1938.     J. SPENCER     2,131,824
CONTROL APPARATUS FOR AIRCRAFT
Filed March 19, 1938
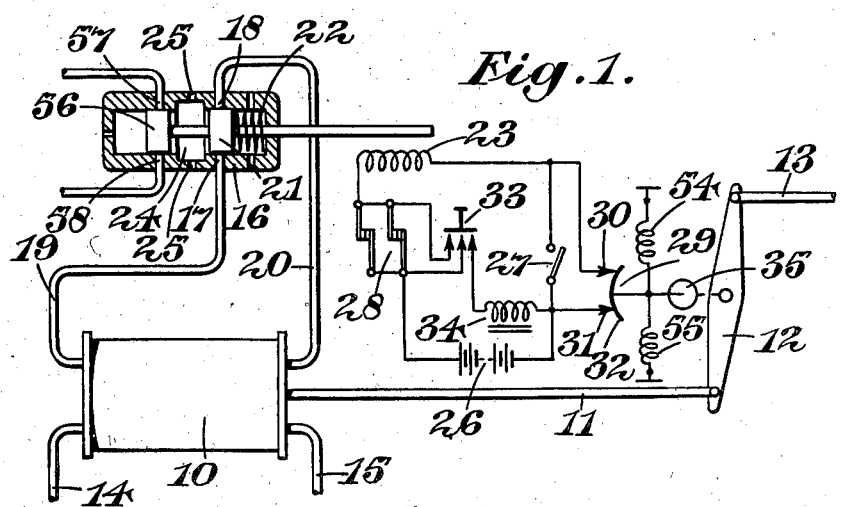
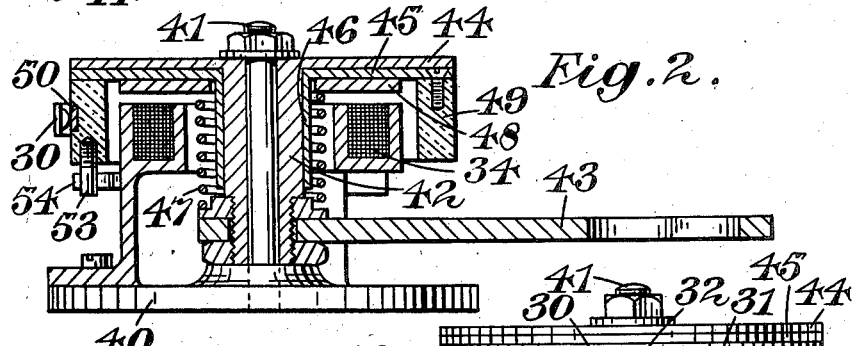
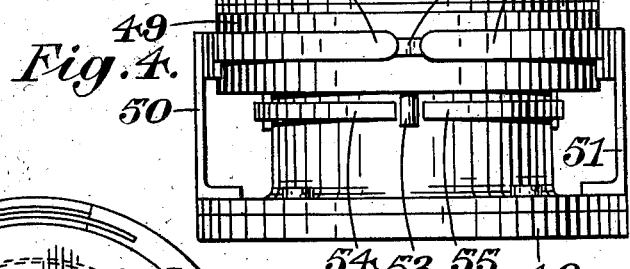
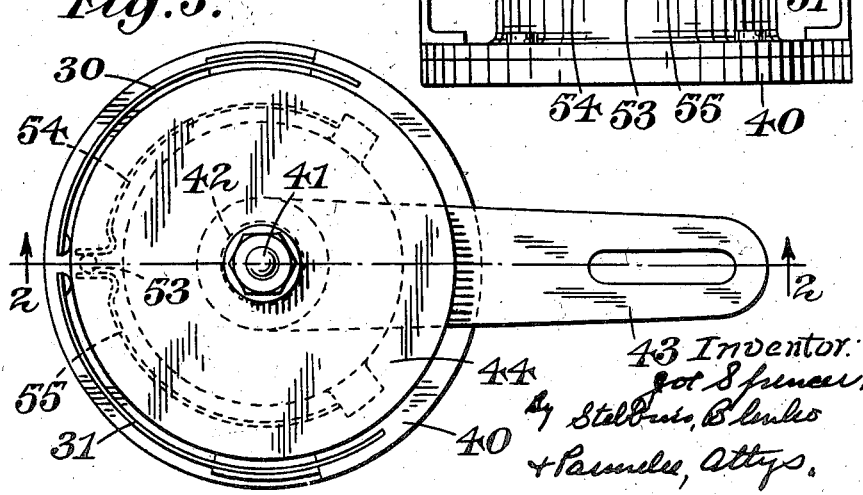
Inventor.
Jot Spencer,
by Stebbins, Blenko
& Parmelee, Attys.

Patented Oct. 4, 1938

2,131,824

UNITED STATES PATENT OFFICE 2,131,824

CONTROL APPARATUS FOR AIRCRAFT

Joe Spencer, Farnborough, England, assignor to S. Smith & Sons (Motor Accessories) Limited, Cricklewood, London, England, a British company Application March 19, 1938, Serial No. 197,005
In Great Britain March 31, 1937

7 Claims. (Cl. 244—76)

This invention relates to apparatus for controlling the flight of aircraft, and is concerned with such apparatus in which a control surface of the aircraft such as an elevator, rudder or aileron, is controlled automatically, for instance by means of a gyroscopic device, in order to maintain a predetermined condition of flight.

According to the present invention there is provided an apparatus for controlling the flight of an aircraft comprising the combination with an automatic control for a control surface of the aircraft, of means for automatically releasing the control surface from the automatic control upon movement of the control surface exceeding a predetermined amount from a selected position to which it is preset under the control of the pilot according to the attitude of flight. Thus should the control surface be moved automatically from a selected position through a comparatively large angle, for instance of the order of 5° in either direction, which may be undesirable, the control surface is released from the automatic control. Consequently, for every attitude of flight the automatic control is only permitted for a given range of movement of the control surface from the optimum position for the particular attitude of flight.

A feature of the invention consists in the provision of an operating member movable with the control surface and connected to the releasing means, the connection being adjustable by the pilot. Means is also conveniently provided under the control of the pilot to re-establish the automatic control of the control surface after it has been released as aforesaid.

In one form of the apparatus according to the invention the releasing means aforesaid comprises an electric switch consisting of a movable switch member carrying an electric contact cooperating with a relatively fixed contact, or contacts, and resilient means biasing the switch member to a normal position with respect to the fixed contacts, and the operating member is connected to the switch member by means of a releasable coupling for permitting a resetting of position of the operating member in relation to the switch member.

The automatic control of the control surface is preferably effected by means of a gyroscopically controlled fluid-operated servomotor, and for releasing this automatic control there is conveniently provided a release valve for the servomotor which is opened or permitted to open under the control of electrical means in circuit with the switch contacts.

In a specific construction of the switch, the operating member thereof is coupled to the switch member by means of a friction clutch which is released for resetting purposes by means of an electro-magnet in circuit with a manually controlled switch.

One form of the apparatus according to the invention is shown by way of example in the accompanying drawing, in which:—

Figure 1 is a diagram of the control apparatus;
Figure 2 is a sectional elevation of the switch;
Figure 3 is a plan of the switch, and
Figure 4 is an elevation at right-angles to Figure 2.

Referring to Figure 1, there is shown a servomotor 10 controlling the elevators of an aircraft in the manner described in British patent specification No. 365,186. This servomotor consists of a double-acting piston and cylinder device in which the piston is connected by a rod 11 to one end of a pivoted arm 12, the other end of which is connected by a link 13 to the elevators of the aircraft. The opposite ends of the cylinder of the servomotor 10 are connected by pipes indicated at 14 and 15 to a distributing valve controlling an air supply to the servomotor, this valve being in turn controlled by the gyroscope.

A release valve 16 has two ports 17 and 18 communicating by pipes 19 and 20 respectively with opposite ends of the cylinder of the servomotor 10, and these ports are normally closed by a piston 21. The piston 21 is normally retained in the closed position against the action of a spring 22 by means of a solenoid 23 associated with the piston-rod, but should this solenoid be de-energized the piston 21 is moved by the spring to an enlarged part 24 of the valve cylinder so that the ports 17 and 18 are made open to atmosphere through ports 25.

The solenoid 23 is connected in circuit with an electric current source 26, holding on contacts 28 controlled by this solenoid and a control switch 29 comprising two fixed contacts 30 and 31, and a movable contact 32 normally maintained in a position bridging the contacts 30 and 31 by means of springs 54 and 55. The movable contact is mechanically connected to the arm 12 by an adjustable coupling indicated at 35 for movement with the elevators. The coupling is released to permit resetting of the movable contact 32 in relation to the elevators by an electro-magnet 34 being energized as hereinbefore described.

The movable contact 32 is arranged so that it opens the circuit through the contacts 30 and 31 upon a small movement in one direction or the other and of the same or different extent. Should the elevators have a movement in either direction which is more than a predetermined amount governed by the normal relationship between the movable contact 32 and the fixed contacts 30 and 31, the switch 29 will be opened and the solenoid 23 de-energized. The piston valve 21 is moved to the left in Figure 1 under the action of the spring 22 and places the cylinder of the servomotor 10 at atmospheric pressure so that the automatic control of the elevators is immediately discontinued. The range of movement of the elevators may for example be of the order of 5° in opposite directions from the normal position.

With the opening of the switch 29 the contacts 28 also open so that the solenoid 23 is not re-energized should the moving contact 32 of the switch be returned to its normal position with respect to the fixed contacts 30 and 31. A push-button switch 33 provided in a position accessible to the pilot serves to energize the electro-magnet 34 through the current source 26, so as to release the coupling 35 and permit the moving contact 32 to be centralized by the springs 54 and 55.

The operation of the push-button switch 33 also energizes the solenoid 23 by completing a circuit through the contacts 30 and 31 when again bridged by the contact 32 so that the valve 21 is returned to the closed position. The solenoid 23 also closes its holding contacts 28 to maintain the solenoid energized after the push-button switch 33 is released and until the contact 32 is moved more than the predetermined amount. Thus, if a new attitude of flight is adopted then by operating the push-button switch 33, the pilot can reset the switch 29 for the new adjustment of the elevators. A switch 27 is provided for short-circuiting the contacts 30 and 31 when unrestricted working is required.

The construction of the switch 29 is shown in Figures 2 to 4 and comprises a base 40 having an upright pillar 41 on which a sleeve 42 is rotatably mounted, an operating member such as the arm indicated at 43 being rigidly mounted on the sleeve 42 and arranged for connection to the elevators, for instance to the arm 12 (Figure 1). The sleeve 42 is provided with a flange 44 and a second flange 45 arranged adjacent the flange 44 is carried on a sleeve 46 which is rotatable on the sleeve 42. The flange 45 is maintained in frictional engagement with the flange 44 by means of a spring 47 bearing on the flange 45 through the medium of an interposed washer 48 of magnetic material. A ring 49 of insulating material is secured to the underside of the flange 45 and carries the moving electric contact 32 inset in its outer face. The co-operating fixed contacts 30 and 31 consisting of arcuate strips of conducting material are mounted on fixed supports 50 and 51 respectively. The electro-magnet 34 is arranged surrounding the column 41 and when energized draws down the washer 48 against the action of the spring 47 and permits relative movement of the flanges 44 and 45.

A pin 53 projecting from the lower side of the ring 49 is engaged on opposite sides by the adjacent ends of two leaf-springs 54 and 55, the opposite ends of which are secured to an extension of the base 40 housing the magnet winding 34.

Thus, it will be seen that in the normal position of the switch as shown in Figures 2 to 4, the contact 32 bridges the contacts 30 and 31. When the arm 43 is moved through an appreciable angle as a result of the movement of the elevators, the contact 32 moves away from one or other of the fixed contacts 30 and 31 to open the circuit through the solenoid 23, as hereinbefore described, and at the same time the pin 53 loads the corresponding one of the leaf-springs 44 and 45. When the electro-magnet is energized by the push-button switch 33 the flange 45 is released from the flange 44 and the ring 49 is permitted to turn under the action of the leaf-spring 44 or 45, as the case may be, to the position in which the contact 32 is in its original position with respect to the contacts 30 and 31.

Alternatively or in addition to the automatic control of the elevators, the switch device may control the rudders or ailerons in a similar manner. Furthermore, an additional piston, as indicated at 56 in Figure 1, may be employed to control ports 57 and 58 communicating with fluid-operating means for centralizing the rotor of the gyroscope. The centralizing means is normally maintained inoperative by air pressure applied against the action of a spring, so that by the opening of the ports 57 and 58 to atmosphere serves to bring the centralizing means into operation.

I claim:

1. Apparatus for controlling the flight of an aircraft having a control surface, comprising the combination of automatic control means for said control surface, means for automatically releasing said control surface from the automatic control means when movement of the control surface exceeds a predetermined amount from a selected position and means for presetting said releasing means in relation to the selected position of the control surface for the required attitude of flight.

2. Apparatus for controlling the flight of an aircraft having a control surface, comprising the combination with automatic control means for said control surface, of means for automatically releasing the control surface from the automatic control when movement of the control surface exceeds a predetermined amount from a selected position, means for presetting the releasing means in relation to the selected position of the control surface for the required attitude of flight and manually operated means to re-establish the automatic control of the control surface.

3. Apparatus for controlling the flight of an aircraft having a control surface, comprising the combination with automatic control means for said control surface, of means for releasing the control surface from the automatic control means, an adjustable operative connection between the releasing means and said control surface for automatically operating the releasing means when the movement of the control surface exceeds a predetermined amount from a selected position, and manually operated means for adjusting the said operative connection for a selected position of the control surface corresponding to the required attitude of flight.

4. Apparatus for controlling the flight of an aircraft having a control surface, comprising the combination with automatic control means for said control surface, electrically operated means for releasing the control surface from the automatic control means, a switch controlling the releasing means, an adjustable connection between said switch and the control surface for operation of the switch when the movement of the control surface exceeds a predetermined amount from a selected position, manually operated means for releasing the switch from the said connction and automatic means for adjusting the said connection for a selected position of the control surface corresponding to the required attitude of flight.

5. Apparatus for controlling the flight of an aircraft having a control surface, comprising the combination with automatic control means for said control surface, of electrically operated means for automatically releasing the control surface when movement of the control surface exceeds a predetermined amount from a selected position, which releasing means comprises an electric control switch having movable and relatively fixed switch contacts, resilient means biasing the movable switch contact to a normal position with respect to the fixed contact, a switch operating member connected to the control surface, a releasable coupling between said operating member and said movable switch contact, and means for releasing said coupling to permit resetting of the position of said operating member in relation to said movable switch contact.

6. Apparatus for controlling the flight of an aircraft having a control surface, comprising the combination of a fluid-operated servomotor controlling said control surface, gyroscopic means for controlling the operation of said servomotor, a release valve for the servomotor, electrically operated means for opening said valve to render the servomotor ineffective for moving the control surface, an electric switch in circuit with said electrical means and comprising movable and relatively fixed switch contacts, resilient means biasing the movable switch contact to a normal position with respect to the relatively fixed contact, a switch operating member connected to the control surface, and serving to operate the switch when movement of the control surface exceeds a predetermined amount from a selected position, a releasable coupling between said operating member and said movable switch contact, and means for releasing said coupling to permit resetting of the position of the movable switch member in relation to said operating member by said resilient means, and according to the selected position of the control surface.

7. Apparatus for controlling the flight of an aircraft having a control surface, comprising the combination of automatic control means for said control surface, electrical means for releasing the control surface from said automatic control, a control switch in circuit with said electrical means and having movable and relatively fixed switch contacts, resilient means biasing the movable switch contact to a normal position with respect to the fixed contacts, a switch operating member connected to the control surface, and serving to operate the switch when movement of the control surface exceeds a predetermined amount from a selected position, a friction clutch coupling the said operating member and the movable switch contact, electro-magnetic releasing means for said coupling to permit resetting of the position of the movable switch member in relation to the operating member and by the said resilient means, and a manually controlled switch for said electro-magnetic releasing means.

JOE SPENCER.